(12) United States Patent
Durrani et al.

(10) Patent No.: US 10,787,061 B2
(45) Date of Patent: Sep. 29, 2020

(54) HEAT PUMP SYSTEM WITH ADDITIONAL HEAT SOURCE FOR EVAPORATION OF REFRIGERANT

(71) Applicant: Hanon Systems, Daejeon (KR)

(72) Inventors: Navid Durrani, Elsdorf (DE); Marc Graaf, Krefeld (DE); Christoph Bara, Cologne (DE); Jörn Fröhling, Cologne (DE)

(73) Assignee: HANON SYSTEMS, Daejeon (KR)

( * ) Notice: Subject to any disclaimer, the term of this patent is extended or adjusted under 35 U.S.C. 154(b) by 438 days.

(21) Appl. No.: 15/383,281

(22) Filed: Dec. 19, 2016

(65) Prior Publication Data

US 2017/0182867 A1 Jun. 29, 2017

(30) Foreign Application Priority Data

Dec. 23, 2015 (DE) .................. 10 2015 122 721

(51) Int. Cl.
*B60H 1/00* (2006.01)
*B60H 1/03* (2006.01)
*B60H 1/32* (2006.01)

(52) U.S. Cl.
CPC ........ *B60H 1/323* (2013.01); *B60H 1/00342* (2013.01); *B60H 1/00885* (2013.01);
(Continued)

(58) Field of Classification Search
CPC ........... B60H 1/00885; B60H 1/00899; B60H 1/323; B60H 2001/00928;
(Continued)

(56) References Cited

U.S. PATENT DOCUMENTS

| 7,003,975 B2 * | 2/2006 | Feuerecker ........ B60H 1/00921 62/278 |
| 2012/0085114 A1 * | 4/2012 | Graaf .................... B60H 1/323 62/238.7 |

(Continued)

FOREIGN PATENT DOCUMENTS

| DE | 20121533 U1 | 11/2002 |
| DE | 102010042127 A1 | 4/2012 |

(Continued)

*Primary Examiner* — Tavia Sullens
(74) *Attorney, Agent, or Firm* — Shumaker, Loop & Kendrick, LLP; James D. Miller (57) ABSTRACT

An air conditioning system of a motor vehicle with a refrigerant circuit for operation in a refrigerator mode and a heat pump mode. The refrigerant circuit includes a primary circuit with a compressor, a heat exchanger for heat transfer between the refrigerant and the surroundings, an expansion element and a heat exchanger for heat transfer from the intake air being conditioned for the passenger compartment to the refrigerant, and a first flow path. The flow path extends from a branching point between the compressor and the heat exchanger to an opening and includes a heat exchanger for heat transfer from the refrigerant to the intake air being conditioned for the passenger compartment. The heat exchanger is situated in a flow direction of intake air of the passenger compartment after the heat exchanger.

8 Claims, 6 Drawing Sheets

(52) U.S. Cl.
CPC ..... *B60H 1/00899* (2013.01); *B60H 1/00921* (2013.01); *B60H 1/32281* (2019.05); *B60H 2001/00928* (2013.01); *B60H 2001/00949* (2013.01); *B60H 2001/00957* (2013.01)

(58) Field of Classification Search
CPC ........... B60H 2001/00949; B60H 2001/00957; B60H 1/32281; B60H 1/03; B60H 1/00921; B60H 1/00342; F25B 2400/054
See application file for complete search history.

(56) References Cited

U.S. PATENT DOCUMENTS

| | | | | |
|---|---|---|---|---|
| 2013/0025311 | A1* | 1/2013 | Graaf | B60H 1/00271 62/238.7 |
| 2014/0075966 | A1* | 3/2014 | Schmitz | B60H 1/00921 62/56 |
| 2016/0318373 | A1* | 11/2016 | Kang | B60H 1/00921 |

FOREIGN PATENT DOCUMENTS

| | | |
|---|---|---|
| DE | 102011109506 A1 | 2/2013 |
| DE | 102011118162 A1 | 5/2013 |
| DE | 102012111672 A1 | 10/2013 |
| DE | 102014102078 A1 | 8/2015 |
| JP | 2000025448 A | 1/2000 |
| JP | 2000052757 A | 2/2000 |
| KR | 2006177632 A | 7/2006 |
| KR | 20070025278 A | 3/2007 |
| KR | 20140033223 A | 3/2014 |
| KR | 20150098167 A | 8/2015 |
| WO | WO-2015111847 A1 * | 7/2015 ................ F25B 5/00 |

\* cited by examiner

HEAT PUMP SYSTEM WITH ADDITIONAL HEAT SOURCE FOR EVAPORATION OF REFRIGERANT

CROSS-REFERENCE TO RELATED PATENT APPLICATIONS

This patent application claims the benefit of German Patent Application No. 10 2015 122 721.5 filed Dec. 23, 2015. The disclosure of the above patent application is hereby incorporated herein by reference in its entirety.

FIELD OF THE INVENTION

The invention concerns an air conditioning system for conditioning the air of a passenger compartment of a motor vehicle with a refrigerant circuit for an operation in a refrigerator mode and in a heat pump mode. The refrigerant circuit comprises a primary circuit with a compressor, a heat exchanger for heat transfer between the refrigerant and the surroundings, an expansion element and a heat exchanger for heat transfer from the intake air being conditioned for the passenger compartment to the refrigerant. The refrigerant circuit is furthermore configured with a first flow path, which extends from a branching point arranged between the compressor and the heat exchanger for heat transfer between the refrigerant and the surroundings up to an opening and which comprises a heat exchanger for heat transfer from the refrigerant to the intake air being conditioned for the passenger compartment, wherein the heat exchanger is situated in the flow direction of the intake air of the passenger compartment after the heat exchanger for heat transfer from the intake air being conditioned for the passenger compartment to the refrigerant. The air conditioning system furthermore comprises at least one coolant-refrigerant heat exchanger as a component of a low temperature coolant circuit.

BACKGROUND OF THE INVENTION

Furthermore, the invention concerns a method for operating the air conditioning system.

In motor vehicles known from the prior art, the waste heat of the engine is used to warm the intake air for the passenger compartment. The waste heat is transported by means of the coolant circulating in the engine coolant circuit to the air conditioning system and transferred there via the heating heat exchanger to the air flowing into the passenger compartment. Known systems with coolant/air heat exchanger, which draw their heating power from the coolant circuit of an efficient combustion engine of the vehicle drive train, no longer achieve the level required for a comfortable heating of the passenger compartment at low surrounding temperatures so as to cover the entire heating demand of the passenger compartment. The same applies to systems in vehicles with a hybrid propulsion system.

If the total heat demand of the passenger compartment cannot be covered by means of the heat from the engine coolant circuit, additional heating measures are needed, such as electrical resistor heating (PTC) or fuel-operated heaters. A more efficient way of heating the air for the passenger compartment is a heat pump with air as the heat source, in which case the refrigerant circuit serves both as the sole heating unit and as an additional heating measure.

The air/air heat pumps belonging to the prior art, which are designed for the combined refrigerator and heat pump mode, that is, for a heating mode as well as a reheat mode, take up heat from the ambient air. The conventional air/air heat pumps have a heat exchanger for the heat transfer between the refrigerant and the surroundings, a heat exchanger for supplying heat from the air being conditioned for the passenger compartment to the refrigerant, and a heat exchanger for the heat transfer from the refrigerant to the air being conditioned for the passenger compartment. Each time the power is transferred between the refrigerant and air.

In the so-called reheat mode, the air being supplied to the passenger compartment is cooled, whereupon it is dehumidified and then slightly heated up again. In this operating mode, the required reheating power is less than the required refrigerating power for the cooling and dehumidifying of the air.

The heat exchanger for the heat transfer between the refrigerant and the ambient air of the air/air heat pump is arranged in this case outside the housing of the air conditioning system at the front end of the motor vehicle and is provided with air in particular from the driving wind. The heat exchanger situated outside the housing of the air conditioning systems is also known as the ambient heat exchanger. During operation of the refrigerant circuit in the refrigerator mode, the ambient heat exchanger is operated as a condenser/gas cooler in order to surrender heat from the refrigerant to the ambient air and during operation of the refrigerant circuit in the heat pump mode it is operated as an evaporator to take up heat by the refrigerant from the ambient air.

DE 102012111672 A1 presents a refrigerant circuit of an air conditioning system for conditioning the air of a passenger compartment of a motor vehicle. The refrigerant circuit is designed for a combined operation in the refrigerator and heat pump mode as well as a reheat mode and it comprises a compressor, a heat exchanger for the heat transfer between the refrigerant and the surroundings, a first expansion element, as well as a heat exchanger for the supply of heat from the air being conditioned for the passenger compartment to the refrigerant, a heat exchanger for the heat transfer from the refrigerant to the air being conditioned for the passenger compartment, and a second expansion element connected to the latter in the flow direction of the refrigerant.

In air/air heat pumps known in the prior art, the heat in the heat pump mode is taken up solely by the evaporation of the refrigerant in the ambient heat exchanger, so that the ambient heat exchanger represents the single heat source for the refrigerant.

At temperatures of the ambient air in the range of 0° C. and below 0° C., the heat transfer surface of the ambient heat exchanger can become frosted. As a result of the uptake of heat from the ambient air, the relative humidity of the cooled air increases. If the temperature drops below the dew point, the water vapor present in the air condenses out and is deposited as water on the heat transfer surface. The water condensing out from the air on the heat transfer surface will freeze into ice at surface temperatures in the range of 0° C. and below 0° C. The increasing ice layer reduces the heat transfer surface at the air side as well as the heat transfer at the air side and thus the heat transfer between the air and the refrigerant being evaporated, which leads to a lowering of the evaporation temperature and the evaporation pressure of the refrigerant.

In order to prevent or at least slow down the icing of the heat transfer surface of the ambient heat exchanger, the suction pressure of the compressor of the refrigerant circuit during operation in heat pump mode is limited to a certain lower value. This dictates the maximum possible temperature difference between the ambient air and the evaporation temperature of the refrigerant. However, the limiting of the suction pressure also causes a limiting of the evaporator power as heat taken up from the air and thus the heating power of the air conditioning system when operating in heat pump mode. At low ambient temperatures, especially below −10° C., the heating power is not enough for a comfortable warming of the air of the passenger compartment. The lack of heating power has to be compensated by the use of additional heating concepts.

Furthermore, it is known from the prior art how to transfer the waste heat, especially that of the electric drive components, for example, from the charging air cooling, to the coolant of a low temperature coolant circuit and then surrender it via a coolant/air heat to the ambient air.

However, the heat present in the low temperature coolant circuit at a lower temperature level can likewise be transferred by using a refrigerant/coolant heat exchanger, also known as a chiller, to the refrigerant in the refrigerant circuit. In particular when operating in heat pump mode, the heat is used for the evaporation of the refrigerant. The utilization of the waste heat from the low temperature coolant circuit on the one hand contributes to raising the heating power and on the other hand to achieving a significantly higher power rating of the air conditioning system. Depending on the needs, heat can also be transferred additionally from the surroundings to the refrigerant by means of the low temperature coolant circuit.

DE 102010042127 A1 discloses a refrigerant circuit of an air conditioning system of a motor vehicle, especially an electric vehicle or a hybrid vehicle. The refrigerant circuit comprises on the one hand a primary circuit with a compressor, a heat exchanger for the heat transfer between the refrigerant and the surroundings, a collector, a first expansion element, a heat exchanger for supplying heat from the air being conditioned for the passenger compartment to the refrigerant as well as a heat exchanger connected in parallel with the heat exchanger. The refrigerant circuit furthermore has a secondary stretch, extending from a branching point situated after the compressor in the flow direction of the refrigerant up to a connection node situated in front of the first expansion element and which comprises a heat exchanger for the heat transfer from the refrigerant to the intake air being conditioned for the passenger compartment, as well as a regulating valve connected to it.

Now, the problem which the invention proposes to solve is to transfer the waste heat produced in the motor vehicle especially that produced by the drive components, to the refrigerant circuit of the air conditioning system and utilize it during the operation in heat pump mode as an additional heat source, besides the ambient air.

Furthermore, the problem which the invention proposes to solve is to further develop and improve the air conditioning system for the combined refrigerator and heat pump operation for the heating, cooling and dehumidifying of the intake air being conditioned for the passenger compartment in a simple design, as well as to provide a method for operating the air conditioning system making possible an improved regulating ability.

The air conditioning system should furthermore be efficient in operation, making use of a plurality of heat sources and heat sinks, and have a compact design. The refrigerant circuit of the air conditioning system should have a simple design and a minimum number of required components, causing only minimal operating costs, manufacturing costs and maintenance costs.

SUMMARY OF THE INVENTION

The problem is solved by the devices and methods with the features disclosed herein.

The problem is solved by an air conditioning system of a motor vehicle according to the invention with a refrigerant circuit for an operation in a refrigerator mode and in a heat pump mode. The refrigerant circuit comprises a primary circuit with a compressor, a heat exchanger for heat transfer between the refrigerant and the surroundings, an expansion element and a heat exchanger for heat transfer from the intake air being conditioned for the passenger compartment to the refrigerant.

The refrigerant circuit is furthermore configured with a first flow path, which extends from a branching point arranged between the compressor and the heat exchanger for heat transfer between the refrigerant and the surroundings up to an opening and which comprises a heat exchanger for heat transfer from the refrigerant to the intake air being conditioned for the passenger compartment. The heat exchanger for heat transfer from the refrigerant to the intake air being conditioned for the passenger compartment is situated in the flow direction of the intake air of the passenger compartment after the heat exchanger for heat transfer from the intake air being conditioned for the passenger compartment to the refrigerant.

The air conditioning system according to the invention comprises at least one coolant-refrigerant heat exchanger as a component of a low temperature coolant circuit.

The refrigerator mode serves primarily for cooling and the heat pump mode for heating the intake air being conditioned for the passenger compartment.

According to the concept of the invention, a heating heat exchanger is designed as a component of a coolant circuit for warming the intake air being conditioned for the passenger compartment. The heating heat exchanger is arranged in the flow direction of the intake air for the passenger compartment after the heat exchanger for the heat transfer from the intake air being conditioned for the passenger compartment to the refrigerant.

The refrigerant circuit preferably has an internal heat exchanger. By internal heat exchanger is meant a heat exchanger internal to the circuit, serving for the heat transfer between the refrigerant under different parameters of state. One side of the internal heat exchanger is advantageously arranged between the heat exchanger for the heat transfer between the refrigerant and the surroundings and the opening of the first flow path, so that the internal heat exchanger in certain operating modes receives no refrigerant mass flow, or a different mass flow on either side.

The refrigerant circuit advantageously comprises a collector, which is arranged in the flow direction of the refrigerant after the heat exchanger for the heat transfer from the intake air being conditioned for the passenger compartment to the refrigerant. Thus, the collector is arranged between the heat exchanger for the heat transfer from the intake air being conditioned for the passenger compartment to the refrigerant and one side of the internal heat exchanger, as well as the suction side of the compressor.

According to a preferred embodiment of the invention, the refrigerant circuit is designed for an operation in a reheat mode, wherein a coolant/refrigerant heat exchanger is arranged in a parallel connection to the heat exchanger for the heat transfer from the intake air being conditioned for the passenger compartment to the refrigerant so that the refrigerant can be apportioned between the coolant/refrigerant heat exchanger and the heat exchanger for the heat transfer from the intake air being conditioned for the passenger compartment to the refrigerant. The refrigerant mass flow can advantageously be apportioned between 0% and 100%. Each time, an expansion element is situated in front of the coolant/refrigerant heat exchanger and the heat exchanger for the heat transfer from the intake air being conditioned for the passenger compartment to the refrigerant. The expansion elements are preferably designed as expansion valves, while the expansion valves are advantageously regulable from the outside. [0027] The first flow path preferably has a check valve between the heat exchanger for the heat transfer from the refrigerant to the intake air being conditioned for the passenger compartment and the opening, which allows the refrigerant to pass in the flow direction to the opening.

According to one modification of the invention, the refrigerant circuit is designed with a second flow path, which extends from a branching point arranged between the compressor and the heat exchanger for the heat transfer between the refrigerant and the surroundings up to an opening. The opening is arranged in the flow direction of the refrigerant in front of the compressor and thus on the suction side of the compressor, in particular before the internal heat exchanger and especially before the collector.

The second flow path receives no flow during the operation of the refrigerant circuit in the refrigerator mode and is advantageously designed with a valve.

According to a first alternative embodiment of the invention, within the primary circuit of the refrigerant circuit there is arranged a coolant/refrigerant heat exchanger in series connection with the heat exchanger for the heat transfer between the refrigerant and the surroundings, so that the refrigerant depending on the operating mode of the refrigerant circuit flows through the coolant/refrigerant heat exchanger and then through the heat exchanger for the heat transfer between the refrigerant and the surroundings or through the heat exchanger for the heat transfer between the refrigerant and the surroundings and then through the coolant/refrigerant heat exchanger. Thanks to a direct connection of the heat exchangers, the refrigerant has the same pressure level in the heat exchangers, except for pressure losses due to the flow.

The heat exchanger for the heat transfer between the refrigerant and the surroundings, depending on the operating mode, is operated as a condenser/gas cooler or as an evaporator. The coolant/refrigerant heat exchanger can be operated in refrigerator mode as a condenser/gas cooler and it is operated in heat pump mode as an evaporator. The heat exchanger can receive a bidirectional flow.

According to a second alternative embodiment of the invention, a coolant/refrigerant heat exchanger is formed inside the second flow path of the refrigerant circuit. The coolant/refrigerant heat exchanger during operation of the refrigerant circuit in heat pump mode is arranged in a series connection with the heat exchanger for the heat transfer between the refrigerant and the surroundings, so that the refrigerant flows through the heat exchanger for the heat transfer between the refrigerant and the surroundings and then through the coolant/refrigerant heat exchanger. Thanks to a direct connection of the heat exchangers, the refrigerant has the same pressure level in the heat exchangers, except for pressure losses due to the flow.

The heat exchanger for the heat transfer between the refrigerant and the surroundings, depending on the operating mode, is operated as a condenser/gas cooler or as an evaporator. The coolant/refrigerant heat exchanger is operated in heat pump mode as an evaporator.

The problem is also solved by methods according to the invention for operating an air conditioning system of a motor vehicle with a refrigerant circuit for an operation in a refrigerator mode and in a heat pump mode for the intake air being conditioned for the passenger compartment.

According to the concept, the refrigerant depending on the operating mode of the refrigerant circuit is conducted through the coolant/refrigerant heat exchanger of the low temperature coolant circuit and then through the heat exchanger for the heat transfer between the refrigerant and the surroundings or through the heat exchanger for the heat transfer between the refrigerant and the surroundings and then through the coolant/refrigerant heat exchanger of the low temperature coolant circuit. In this process, the refrigerant has the same pressure level. The heat exchanger for the heat transfer between the refrigerant and the surroundings as well as the coolant/refrigerant heat exchanger is operated during the operation of the refrigerant circuit in heat pump mode as an evaporator for the refrigerant.

In the evaporator, the refrigerant is evaporated and possibly superheated.

According to a second method according to the invention, the refrigerant during operation of the refrigerant circuit in heat pump mode is conducted through the heat exchanger for the heat transfer between the refrigerant and the surroundings and then through the coolant/refrigerant heat exchanger of the low temperature coolant circuit.

In this process, the refrigerant has the same pressure level. The heat exchanger for the heat transfer between the refrigerant and the surroundings as well as the coolant/refrigerant heat exchanger is operated as an evaporator for the refrigerant.

In summary, the air conditioning system according to the invention has various benefits:
air conditioning, especially cooling, dehumidifying and/or heating of the intake air for the passenger compartment with minimal input of electrical energy, and with utilization of lost heat flows for the heating of the passenger compartment, in particular
uptake of heat from a low temperature coolant circuit as additional heat source during operation in heat pump mode for evaporation of the refrigerant making use of a coolant/refrigerant heat exchanger as well as for
cooling of components of the drive train of the vehicle, such as the battery, the electric motor, and the power electronics, especially in hybrid vehicles, and thereby enhanced performance, efficiency and service life of the individual components,
providing of adequate comfort within the passenger compartment,
reduction of the required battery capacity for secondary consumers, especially in hybrid vehicles, and associated with this:
weight reduction,
cost reduction, and
sparing of limited resources, such as lithium.

BRIEF DESCRIPTION OF THE DRAWINGS

Further details, features and benefits of embodiments of the invention will emerge from the following description of sample embodiments with regard to the corresponding drawings. Each time an air conditioning system is shown with a heating heat exchanger and a refrigerant circuit with internal heat exchanger and an ambient air/refrigerant heat exchanger with:

FIGS. 2A and 2B: the refrigerant circuit during operation in refrigerator mode and in heat pump mode with an additional coolant/refrigerant heat exchanger operated as evaporator and heat source, wherein

FIGS. 3A and 3B: the refrigerant circuit from FIG. 2A, 2B during operation in refrigerator mode and in heat pump mode with the ambient air/refrigerant heat exchanger operating in heat pump mode additionally as a heat source and evaporator, wherein

DETAILED DESCRIPTION OF THE INVENTION

Figure 1A:
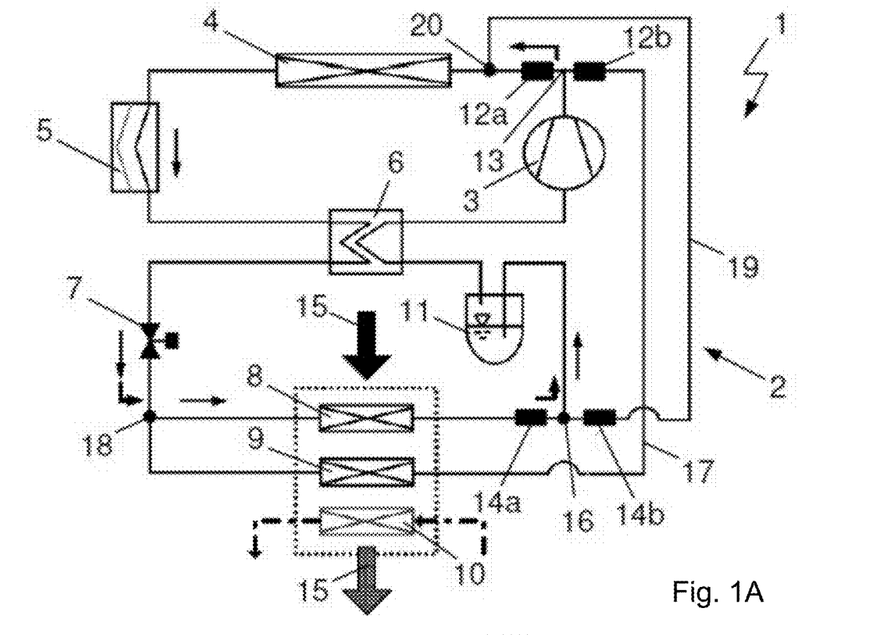
FIGS. 1A and 1C: the refrigerant circuit during operation in refrigerator mode
Figure 1B:
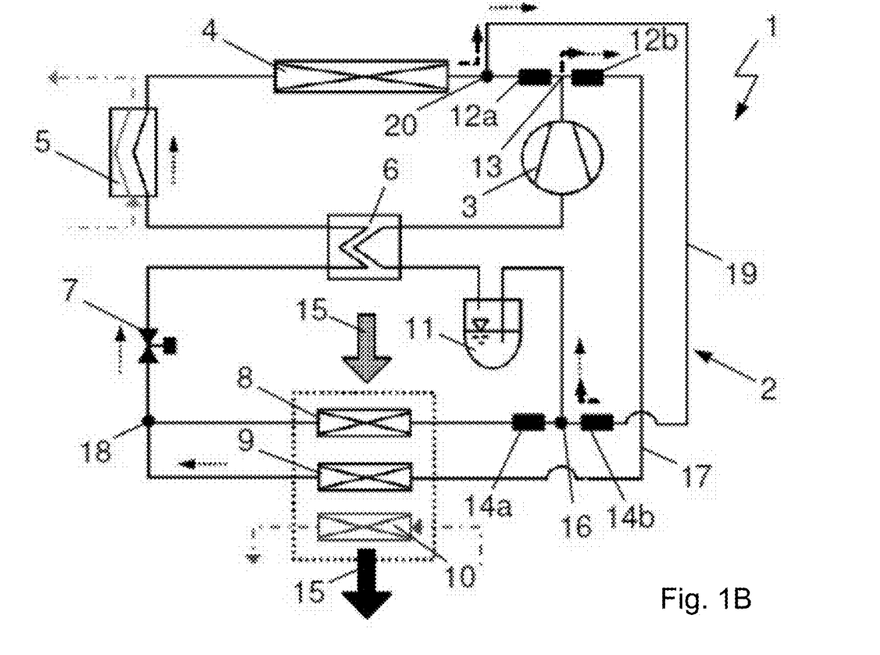
FIGS. 1B and 1D: the refrigerant circuit from FIG. 1A, 1C during operation in heat pump mode with serial connection of two heat exchangers operated as heat source and evaporator, especially a coolant/refrigerant heat exchanger and the ambient air/refrigerant heat exchanger.
Figure 1C:
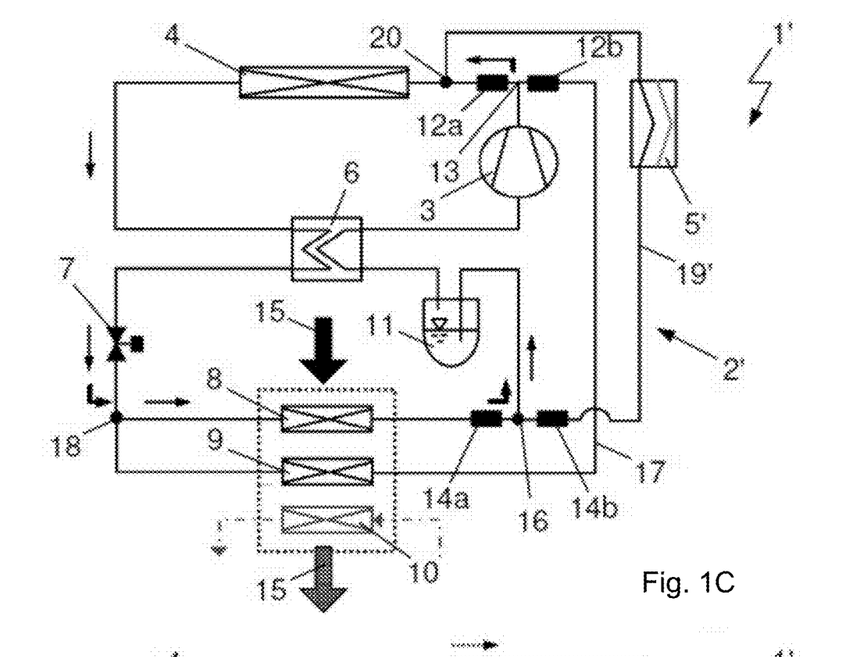
Figure 1D:
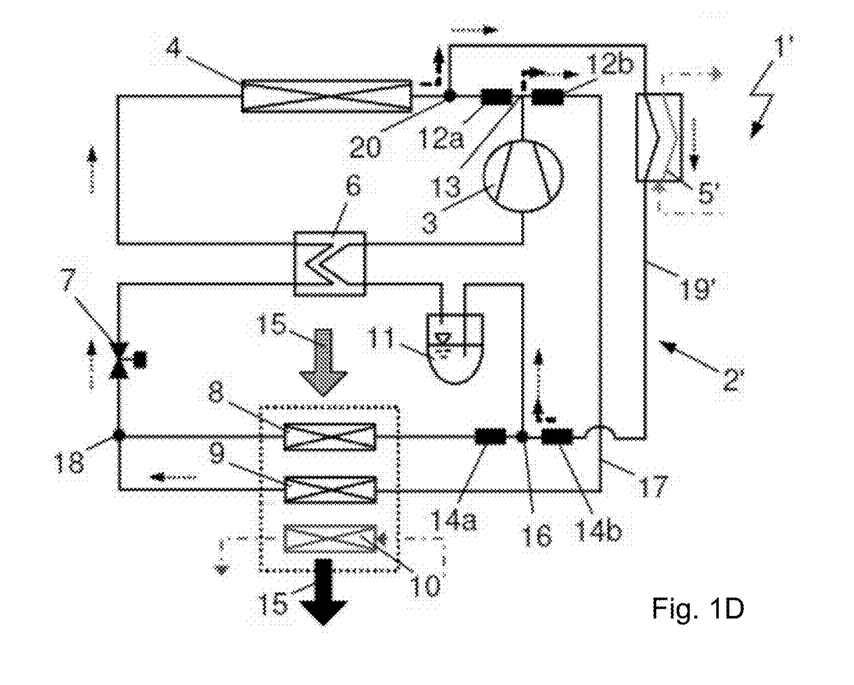

FIG. 1A to 1D show an air conditioning system 1, 1' with a heating heat exchanger 10 of a high temperature coolant circuit and a refrigerant circuit 2, 2' with an internal heat exchanger 6 and an ambient air/refrigerant heat exchanger 4. FIGS. 1A and 1C show the refrigerant circuit 2, 2' during operation in refrigerator mode, FIGS. 1B and 1D show the refrigerant circuit 2, 2' during operation in heat pump mode with serial connection of two heat exchangers 4, 5, 5' operated as heat source and evaporator, especially a coolant/refrigerant heat exchanger 5, 5' of a low temperature coolant circuit and the ambient air/refrigerant heat exchanger 4.

The refrigerant circuit 2, 2' comprises a primary circuit with a compressor 3, the ambient air/refrigerant heat exchanger 4, the internal heat exchanger 6, an expansion element 7, and an evaporator 8 for cooling and/or dehumidifying the intake air 15 being conditioned for the passenger compartment, as well as a separator and collector 11. The components of the primary circuit, interconnected by refrigerant pipelines, receive a flow of refrigerant during operation in the refrigerator mode in the sequence indicated in FIGS. 1A and 1C. The flow direction of the refrigerant is designated by arrows with solid lines.

By the internal heat exchanger 6 is meant a circuit-internal heat exchanger, which serves for the heat transfer between the refrigerant, for example, depending on operating mode at high pressure and at low pressure or on both sides at low pressure. For example, during operation in refrigerator mode, on the one hand liquid refrigerant is further cooled down after condensation and possibly super cooling after the condensation, and on the other hand the suction gas is superheated upstream from the compressor 3.

The collector 11, also called the accumulator, serves for separating and collecting of refrigerant liquid and is arranged, on the low pressure side, in the flow direction of the refrigerant after the evaporator 8, in particular between an opening 16 and the internal heat exchanger 6.

The refrigerant circuit 2, 2' comprises, besides the primary circuit, a first flow path 17 and a second flow path 19, 19'. The first flow path 17 extends from a branching point 13 up to an opening 18 and comprises a shutoff valve 12B as well as a heat exchanger 9 operating as a condenser/gas cooler. The condenser/gas cooler 9 is hooked up in the flow direction of the intake air 15 for the passenger compartment, that is, the air being supplied to the passenger compartment, after the evaporator 8. According to an alternative embodiment, not shown, the valves 12A, 12B and the branching point 13 are designed as a 3-way valve.

The second flow path 19, 19' extends from a branching point 20 arranged between the compressor 3 and in particular the branching point 13 and the heat exchanger 4 up to the opening 16 and it has a valve 14b.

According to a first embodiment of the refrigerant circuit 2 per FIGS. 1A and 1B, the coolant/refrigerant heat exchanger 5 of the low temperature coolant circuit, also called the chiller, is arranged within the primary circuit between the ambient air/refrigerant heat exchanger 4 and the internal heat exchanger 6.

According to a second embodiment of the refrigerant circuit 2' per FIGS. 1C and 1D, the coolant/refrigerant heat exchanger 5' of the low temperature coolant circuit is arranged within the second flow path 19'.

During operation in refrigerator mode per FIGS. 1A and 1C, the gaseous and superheated refrigerant flows under high pressure from the compressor 3 through the opened shutoff valve 12A to the ambient air/refrigerant heat exchanger 4 and upon flowing through the heat exchanger 4 it gives up heat to the ambient air. The refrigerant condenses and possibly becomes undercooled. Upon the subsequent flowing through the internal heat exchanger 6, the refrigerant is further undercooled and expanded to low pressure in the expansion element 7, which is designed for example as an expansion valve. The shutoff valves 12B, 14b are closed. The first flow path 17 and the second flow path 19, 19' do not receive any refrigerant.

Upon flowing through the evaporator 8, the refrigerant takes up heat from the air being furnished to the passenger compartment and evaporates. The refrigerant flows through the opened valve 14a to the collector 11 and is aspirated in the gaseous state from the compressor 3 through the internal heat exchanger 6. In the internal heat exchanger 6, the refrigerant at low pressure is superheated. The primary circuit is closed.

In the first embodiment of the refrigerant circuit 2 per FIG. 1A, refrigerant flows through the coolant/refrigerant heat exchanger 5. Depending on the needs, heat can be transferred from the refrigerant to the coolant of the low temperature coolant circuit or the coolant/refrigerant heat exchanger 5 receives no flow of coolant.

When the refrigerant circuit 2, 2' is operating in refrigerator mode, the air cooled and/or dehumidified upon flowing through the evaporator 8 and before being taken to the passenger compartment can be heated by flowing across the heat transfer surface of the heating heat exchanger 10, so that an operation resembling a reheat mode is made possible with heat from a high temperature coolant circuit.

During operation in heat pump mode per FIGS. 1B and 1D, the flow direction of the refrigerant is designated by arrows with broken lines. The gaseous and superheated refrigerant flows under high pressure from the compressor 3 through the opened shutoff valve 12B through the first flow path 17 to the heat exchanger 9 operating as a condenser/gas cooler and upon flowing through the heat exchanger 9 it gives up heat to the intake air 15 being conditioned for the passenger compartment. The refrigerant condenses and possibly becomes undercooled. During the subsequent flowing through the expansion element 7, the refrigerant is expanded to low pressure and conducted through the internal heat exchanger 6. The expansion element 7, designed in particular as an expansion valve, and the internal heat exchanger 6 can receive a bidirectional flow of the refrigerant.

Upon flowing through the two serially connected heat exchangers 4, 5, 5' operating as heat sources and evaporator, the refrigerant takes up heat. With the help of the heat exchanger 5, 5', additional heat from a low temperature coolant circuit, such as the electric drive train, the battery or electronic components, is coupled into the refrigerant circuit 2, 2'. With the heat exchangers 4, 5, 5', two independent heat sources are formed for the evaporation of the refrigerant and thus the uptake of the heat from the refrigerant.

If the liquefaction of the refrigerant occurs during subcritical operation, as is the case for example with the refrigerant R134a or under certain environmental conditions with carbon dioxide, the heat exchanger 9 will be designated as a condenser. A portion of the heat transfer occurs at constant temperature. In supercritical operation or supercritical heat transfer in the heat exchanger 9, the temperature of the refrigerant steadily diminishes. In this case, the heat exchanger 9 is also called a gas cooler. Supercritical operation can occur under certain environmental conditions or operating modes of the air conditioning system 1, 1', such as with carbon dioxide as the refrigerant.

According to the first embodiment per FIG. 1B, the refrigerant first flows through the coolant/refrigerant heat exchanger 5 and evaporates to take up heat from the coolant of the low temperature coolant circuit before it then flows through the ambient air/refrigerant heat exchanger 4 and evaporates further, taking up heat from the ambient air, and possibly becomes superheated. After this, the refrigerant is conducted across the branching point 20 through the second flow path 19 and through the opened valve 14b to the collector 11. The heat exchangers 4, 5 can receive a bidirectional flow of the refrigerant.

According to the second embodiment per FIG. 1D, the refrigerant after passing through the internal heat exchanger 6 first flows through the ambient air/refrigerant heat exchanger 4 and evaporates to take up heat from the ambient air, before it then flows across the branching point 20 through the second flow path 19' and thus through the coolant/refrigerant heat exchanger 5', taking up heat from the coolant of the low temperature coolant circuit and evaporating further, possibly becoming superheated. The refrigerant is then taken through the opened valve 14b to the collector 11. The heat exchanger 4 can receive a bidirectional flow of the refrigerant.

The shutoff valves 12A, 14a are closed. The first flow path 17 and the second flow path 19, 19' receive a flow of refrigerant, while no refrigerant flows through the evaporator 8.

The refrigerant drawn in by the compressor 3 flows from the collector 11 in gaseous state through the internal heat exchanger 6 and is cooled down. At the same time, the refrigerant having been expanded to low pressure after flowing through the expansion element 7 is partly evaporated. The refrigerant upon passing through the heat exchanger 4, 5, 5' is evaporated and in particular has become superheated so that the cooling of the refrigerant in the internal heat exchanger 6 does not result in the refrigerant being in the two-phase region prior to the compression, but instead it has a residual superheating.

Consequently, the superheated refrigerant may be further cooled down or desuperheated prior to the compression under certain circumstances, which is desirable in principle and of advantage when operating in heat pump mode. Since the collector 11 is placed before the compressor 3 in the flow direction of the refrigerant, this ensures that the suction gas has no liquid fractions. The liquid is separated in the collector 11.

Since the refrigerant moreover cannot be cooled down in the internal heat exchanger 6 prior to being aspirated by the compressor 3 to a temperature which is below the temperature of the refrigerant after the expansion in the expansion element 7, the refrigerant is not cooled down to the two-phase region prior to the process of compression. Consequently, the suction gas will always have a residual superheating. Disregarding the pressure losses due to flow through the heat exchangers 4, 5, 5', 6, the collector 11 or the valve 14b, the refrigerant can at most be cooled down to the phase boundary prior to the compression. The refrigerant would not be superheated.

During operation in heat pump mode, the refrigerant may have very high temperatures at the exit from the compressor 3, especially when the ratio between the high pressure and the suction pressure is large, and even the permissible exit temperature of the refrigerant might be exceeded at the compressor 3. The reaching or exceeding of the permissible exit temperature would in turn result in a slowdown of the compressor 3, that is, a decrease in the number of revolutions and/or the stroke Volume. To avoid a slowdown of the compressor 3, the refrigerant upon entering the compressor 3 should have little or no superheating if possible, so that the refrigerant also at the exit from the compressor 3 does not reach the maximum permissible exit temperature. In particular when using carbon dioxide as refrigerant, also known as R744, a shifting of the suction state of the refrigerant to the superheated region will result in a high exit temperature of the refrigerant at the compressor 3, as well as a higher power uptake of the compressor 3. Thus, besides avoiding the reaching of the maximum permissible exit temperature of the refrigerant, a minimal superheating also results in higher efficiency for the operation of the refrigerant circuit 2.

During operation in heat pump mode, the intake air 15 for the passenger compartment after taking up heat at the heat transfer surfaces of the heat exchanger 9 can be further heated, as needed, upon flowing across the heating heat exchanger 10.

Figure 2A:
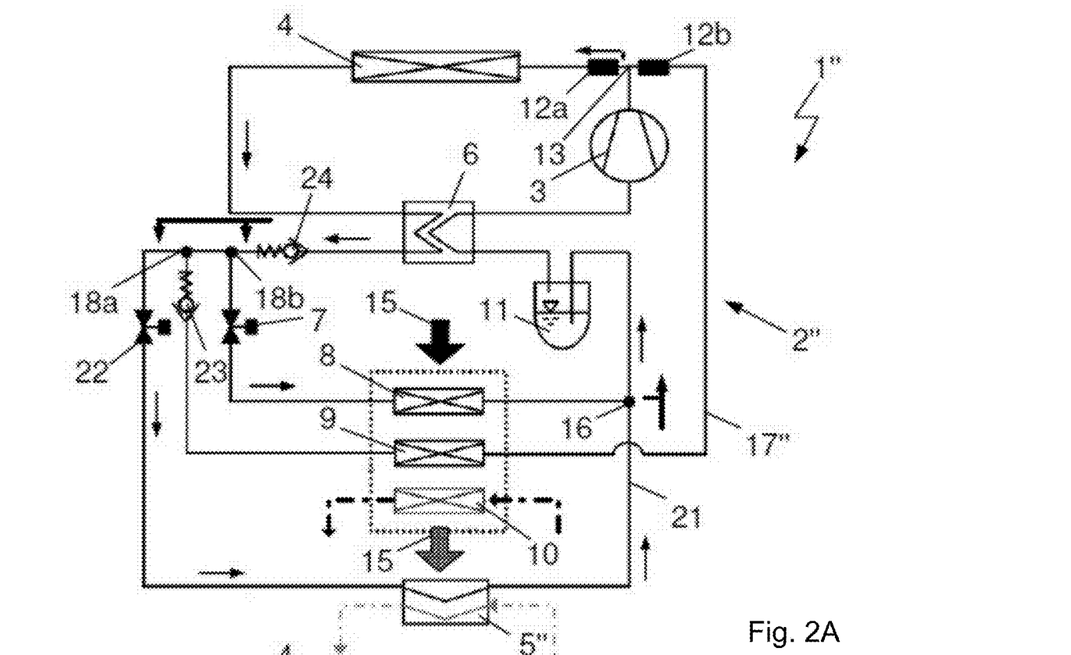
Figure 2B:
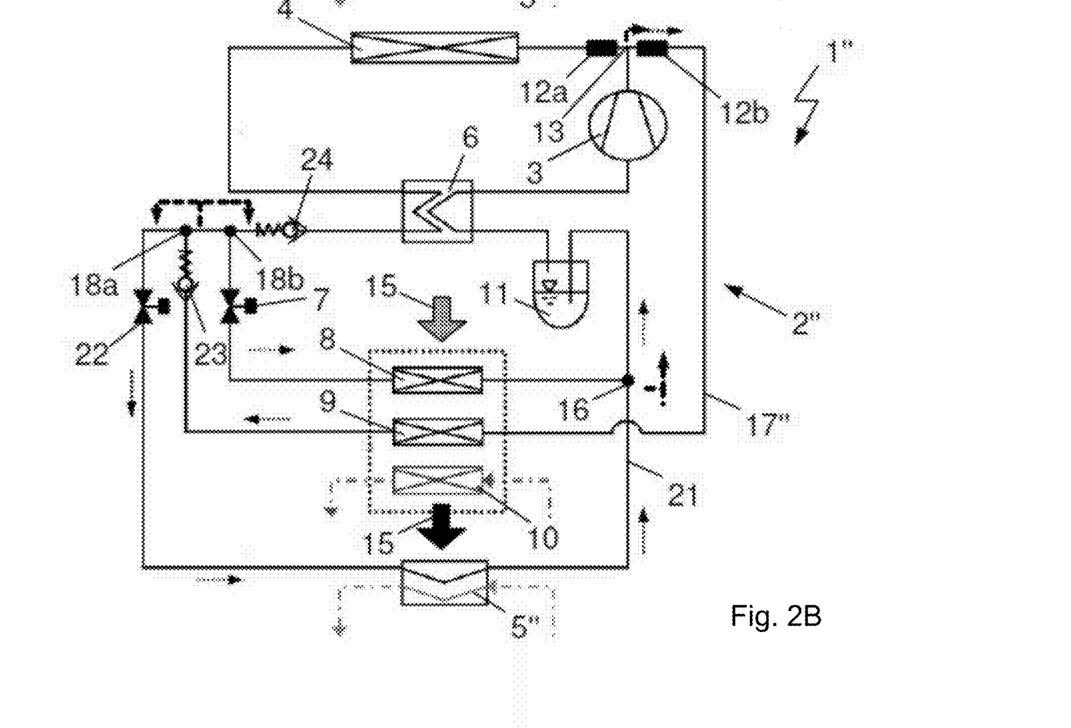
FIG. 2B illustrates the refrigerant circuit when operating in a reheat mode of the heat pump mode.

FIGS. 2A and 2B show an air conditioning system 1" with the heating heat exchanger 10 and a refrigerant circuit 2" with the internal heat exchanger 6 and the ambient air/refrigerant heat exchanger 4. In FIG. 2A, the refrigerant circuit 2" is shown during operation in refrigerator mode and in FIG. 2B the refrigerant circuit 2" is shown during operation in heat pump mode, each time with an additional coolant/refrigerant heat exchanger 5" operating as evaporator and heat source and connected in parallel with the evaporator 8.

The refrigerant circuit 2" comprises the primary circuit with the compressor 3, the ambient air/refrigerant heat exchanger 4, the internal heat exchanger 6, the expansion element 7, and the evaporator 8 for cooling and/or dehumidifying the air being supplied to the passenger compartment as well as the separator and collector 11. The components of the primary circuit interconnected by the refrigerant lines receive a flow of refrigerant during operation in refrigerator mode in the sequence indicated in FIG. 2A. The flow direction of the refrigerant once again is indicated by arrows with solid lines.

The refrigerant circuit 2" has, besides the primary circuit, a flow path 17" which extends from the branching point 13 up to an opening 18a and which comprises the shutoff valve 12B, the heat exchanger 9 operating as a condenser/gas cooler, as well as a check valve 23. Due to the design and arrangement of the check valve 23, the flow path 17" can only receive the flow of refrigerant in the indicated flow direction. The condenser/gas cooler 9, once again, is connected after the evaporator 8 in the flow direction of the intake air 15 for the passenger compartment.

From the opening 18a there extends another flow path 21 up to the opening 16 arranged between the evaporator 8 and the collector 11 and having a coolant/refrigerant heat exchanger 5" of a low temperature coolant circuit, also called a chiller, and an expansion element 22 situated in front of the coolant/refrigerant heat exchanger 5" in the flow direction of the refrigerant.

During operation of the refrigerant circuit 2" in refrigerator mode per FIG. 2A, the gaseous and superheated refrigerant flows under high pressure from the compressor 3 through the opened shutoff valve 12A to the ambient air/refrigerant heat exchanger 4 and in flowing through the heat exchanger 4 gives up heat to the ambient air. The refrigerant condenses and possibly becomes undercooled. Upon the subsequent flowing through the internal heat exchanger 6, the refrigerant is further undercooled, flows through the check valve 24, and can be apportioned into two refrigerant mass flows at the branching point 18b. The refrigerant apportioned into the refrigerant mass flows is expanded to low pressure in the expansion elements 7, 22, which are designed for example as expansion valves, and then taken to the heat exchangers 5",8. The refrigerant mass flows can be apportioned in this way between 0% and 100%.

The shutoff valve 12B is closed and the check valve 23 receives no flow, so that the flow path 17" receives no flow of refrigerant.

Upon flowing through the heat exchangers 5",8, each operated as an evaporator, the refrigerant takes up heat and evaporates. At the heat exchanger 8 the refrigerant takes up heat from the intake air 15 being conditioned for the passenger compartment and at the heat exchanger 5" the refrigerant takes up heat from the low temperature coolant circuit.

The apportioned refrigerant mass flows are brought together again at the opening 16, the refrigerant flows to the collector 11 and it is aspirated in the gaseous state by the compressor 3 through the internal heat exchanger 6. In the internal heat exchanger 6 the refrigerant at low pressure is superheated. The heat is transferred from the high pressure refrigerant to the low pressure refrigerant.

During operation of the refrigerant circuit 2" in refrigerator mode, the air cooled down and/or dehumidified upon flowing across the evaporator 8 is heated, before being supplied to the passenger compartment, by flowing across the heat transfer surface of the heating heat exchanger 10, so that an operation similar to reheat mode with heat from the high temperature coolant circuit is possible.

Furthermore, during operation of the refrigerant circuit 2" in refrigerator mode the possibility exists of providing cooling power through the coolant/refrigerant heat exchanger 5" for the cooling of electrical components, such as the battery or power electronics, so that all requirements for a comfortable climate in the passenger compartment can be fulfilled, especially also in a hybrid vehicle.

During operation of the refrigerant circuit 2" in heat pump mode per FIG. 2B, the flow direction of the refrigerant is once again designated by means of arrows with broken lines. The gaseous and superheated refrigerant flows under high pressure from the compressor 3 through the opened shutoff valve 12B through the flow path 17" to the heat exchanger 9 operating as a condenser/gas cooler and upon flowing through the heat exchanger 9 it gives up heat to the air being supplied to the passenger compartment. The refrigerant condenses and possibly becomes undercooled. The intake air 15 for the passenger compartment is heated.

Next, the refrigerant is taken through the check valve 23 to the opening 18a and divided into two refrigerant mass flows along paths arranged in parallel. Depending on the position of the expansion valves 7, 22, the refrigerant mass flows can be adjusted between 0% and 100%.

The refrigerant divided into the refrigerant mass flows, as during the operation in refrigerator mode, is expanded to low pressure upon flowing through the expansion elements 7, 22 and then taken to the heat exchangers 5",8. Upon flowing through the respective heat exchanger 5", 8 operating as an evaporator, the refrigerant takes up heat from the intake air 15 being conditioned for the passenger compartment or from the low temperature coolant circuit and evaporates.

The apportioned refrigerant mass flows are brought together again at the opening 16, the refrigerant flows to the collector 11 and it is aspirated in the gaseous state by the compressor 3 through the internal heat exchanger 6. The internal heat exchanger 6 only receives the flow of the low pressure refrigerant and is therefore not active. The shutoff valve 12A is closed and there is no flow through the check valve 24.

With the expansion elements 7, 22 opened, the refrigerant circuit 2" is operated in the so-called reheat mode as indicated by the arrow showing the flow of the refrigerant through the heat exchanger 8 in FIG. 2B. With the expansion element 7 closed, the refrigerant circuit 2" is operated in a pure heat pump mode. The pure heat pump mode accordingly resembles the flow configuration illustrated in FIG. 2B with the exception of the flow through the heat exchanger 8 being ceased in the pure heat pump mode.

Each time the heat sources are the coolant of the low temperature coolant circuit taken through the heat exchanger 5", for example that of the electrical drive train, such as the battery, and also the intake air 15 for the passenger compartment depending on the switching of the expansion element 7. Both during operation of the refrigerant circuit 2" in pure heat pump mode and operation in reheat mode, the intake air 15 being conditioned for the passenger compartment can be further heated after taking up heat at the heat transfer surfaces of the heat exchanger 9, as needed, by flowing across the heating heat exchanger 10.

As compared to the embodiments per FIG. 1A to 1D, the refrigerant circuit 2" per FIGS. 2A and 2B is designed with two expansion elements 7, 22 instead of the single expansion element 7 and with two check valves 23, 24, but it has two fewer shutoff valves 14a, 14b.

Since during operation in heat pump mode the refrigerant does not flow through the ambient air/refrigerant heat exchanger 4, the suction pressure within the refrigerant circuit 2" can be set independently of the ambient temperature, which improves the performance as well as the efficiency of the air conditioning system 1".

Figure 3A:
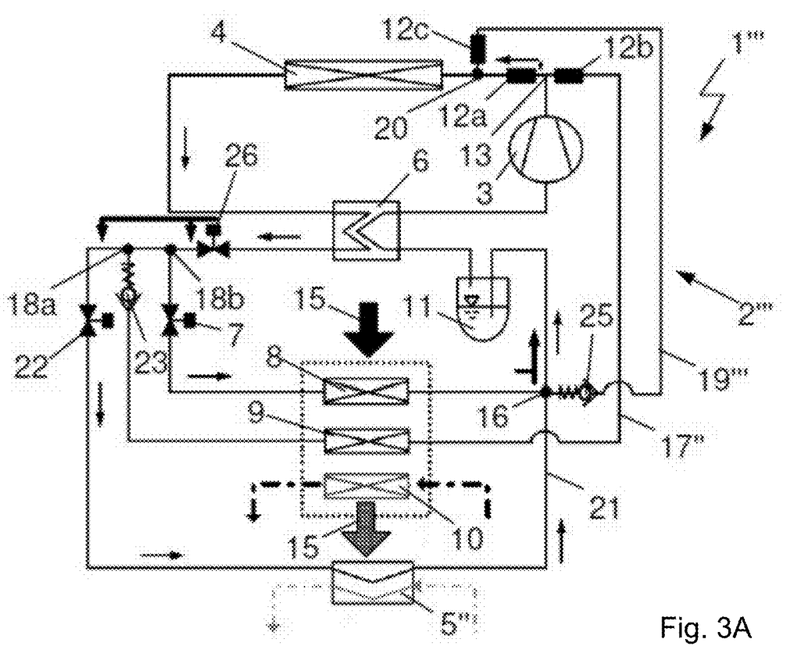
Figure 3B:
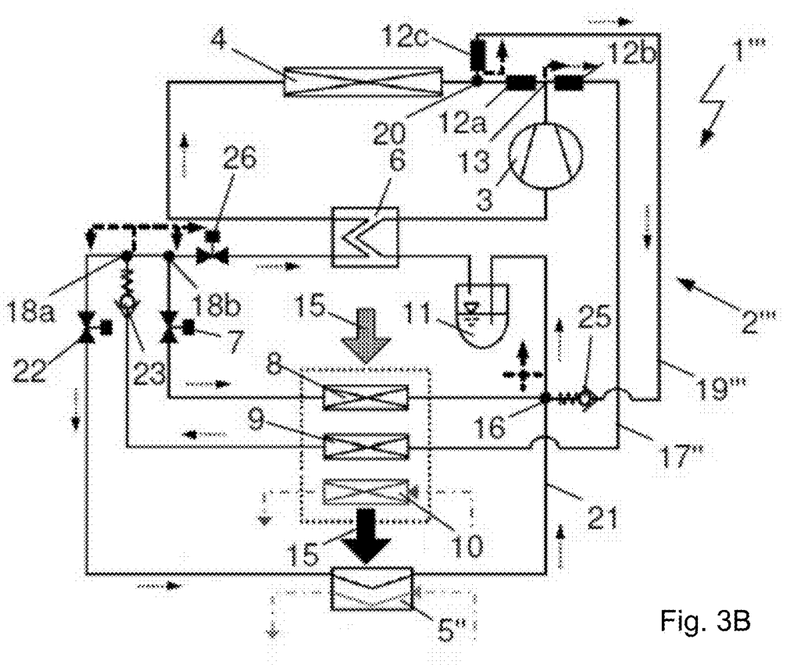
FIG. 3B illustrates the refrigerant circuit when operating in a reheat mode of the heat pump mode.

FIGS. 3A and 3B show an air conditioning system 1''' with the heating heat exchanger 10 and a refrigerant circuit 2''' with the internal heat exchanger 6 and the ambient air/ refrigerant heat exchanger 4 during operation in refrigerator mode and in heat pump mode.

The refrigerant circuit 2''' comprises the refrigerant circuit 2'' of the air conditioning system 1'' from FIGS. 2A and 2B and is expanded with a second flow path 19''', especially in order to utilize the ambient air/refrigerant heat exchanger 4 during operation in heat pump mode as an additional heat source and evaporator.

The refrigerant circuit 2'' from FIGS. 2A and 2B is thus enlarged with the second flow path 19''', similar to the second flow path 19 of the refrigerant circuit 2 from FIGS. 1A and 1B. The second flow path 19''' extends from the branching point 20 arranged between the compressor 3 and especially the branching point 13 and the heat exchanger 4 up to the opening 16 and it has a valve 12c as well as a check valve 26. The valve 12c, like the valves 12A, 12B, is designed as a shutoff valve. The check valve 24 of the refrigerant circuit 2'' from FIGS. 2A and 2B is replaced by an expansion element 26 in the refrigerant circuit 2''' per FIGS. 3A and 3B.

The operation of the refrigerant circuit 2''' in heat pump mode per FIG. 3A substantially corresponds to the operation of the refrigerant circuit 2'' in refrigerator mode per FIG. 2A, so that in this place reference is made to the remarks for FIG. 2A. The additional second flow path 19''' does not receive a flow of refrigerant, the shutoff valve 12c is closed, the check valve 25 furthermore prevents refrigerant from flowing into the flow path 19'''. The expansion element 26 is entirely opened.

The operation of the refrigerant circuit 2''' in heat pump mode per FIG. 3B, the flow direction of the refrigerant being designated by arrows with broken lines, differs from the operation of the refrigerant circuit 2'' in heat pump mode per FIG. 2B by utilizing the ambient air/refrigerant heat exchanger 4 as an evaporator of the refrigerant and thus as an additional heat source. In this place once more, reference is thus made to the remarks for FIG. 2B and only the utilization of the ambient air/refrigerant heat exchanger 4 will be discussed. The additional second flow path 19''' receives a flow of refrigerant, the shutoff valve 12c is opened, and the check valve 25 lets the refrigerant pass through.

The refrigerant taken through the check valve 23 to the opening 18a can be divided into three refrigerant mass flows along three paths arranged in parallel, each time the refrigerant mass flows being regulated according to the position of the expansion elements 7, 22, 26, designed in particular as expansion valves, between 0% and 100%.

The refrigerant divided into the three refrigerant mass flows is expanded to low pressure upon flowing through the expansion elements 7, 22, 26 and then taken to the heat exchangers 4, 5'',8. Upon flowing through the heat exchangers 4, 5'',8, each time operating as an evaporator, the refrigerant takes up heat from the ambient air, from the intake air 15 of the passenger compartment, or from the low temperature coolant circuit and evaporates.

The apportioned refrigerant mass flows are brought together again at the opening 16, the refrigerant conducted through the ambient air/refrigerant heat exchanger 4 flowing across the branching point 20 through the opened shutoff valve 12c, the second flow path 19''' and the check valve 25 to the opening 16.

The merged refrigerant then flows to the collector 11, in the gaseous state it is aspirated by the compressor 3 through the internal heat exchanger 6 and cooled down. At the same time, the internal heat exchanger 6 receives the portion of the refrigerant mass flow conducted through the ambient air/refrigerant heat exchanger 4. The partial mass flow, after flowing through the expansion element 26, is expanded to low pressure and partly evaporated in the internal heat exchanger 6. Furthermore, the refrigerant upon passing through the heat exchanger 4, 5'', 8 is evaporated and in particular superheated, before the refrigerant is cooled down upon flowing through the internal heat exchanger 6 before the compression and it has a residual superheating With expansion elements 7, 22, 26 opened, the refrigerant circuit 2'' is operated in a so-called reheat mode as indicated by the arrow showing the flow of the refrigerant through the heat exchanger 8 in FIG. 3B. With expansion element 7 closed, the refrigerant circuit 2'' is operated in a pure heat pump mode. The pure heat pump mode accordingly resembles the flow configuration illustrated in FIG. 3B with the exception of the flow through the heat exchanger 8 being ceased in the pure heat pump mode.

Each time the heat sources are the coolant of the low temperature coolant circuit taken through the heat exchanger 5'', for example that of the electrical drive train, such as the battery, and also the intake air being supplied for the passenger compartment and/or the ambient air, depending on the switching of the expansion elements 7, 26. Both during operation of the refrigerant circuit 2''' in pure heat pump mode and operation in reheat mode, the intake air being supplied to the passenger compartment can be further heated after taking up heat at the heat transfer surfaces of the heat exchanger 9, as needed, by flowing across the heating heat exchanger 10.

FIG. 3C to 3F show an air conditioning system 1'''', 1''''' with the heating heat exchanger 10 and a refrigerant circuit 2'''', 2''''' with the internal heat exchanger 6 and the ambient air/refrigerant heat exchanger 4 during operation in refrigerator mode or in heat pump mode. The refrigerant circuits 2'''', 2''''' comprise the refrigerant circuit 2''' of the air conditioning system 1''' from FIGS. 3A and 3B and have been enlarged each time with an additional coolant/refrigerant heat exchanger 5, 5', similar to the refrigerant circuits 2, 2' from FIG. 1A to 1D.

Figure 3C:
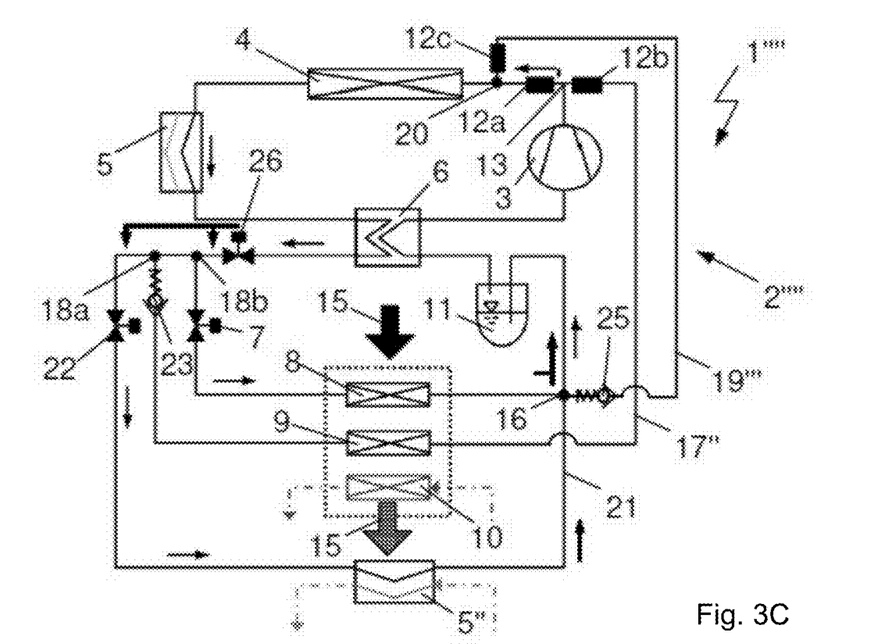
FIGS. 3C and 3E: the refrigerant circuit from FIG. 3A, 3B with an additional coolant/refrigerant heat exchanger during operation in refrigerator mode
Figure 3D:
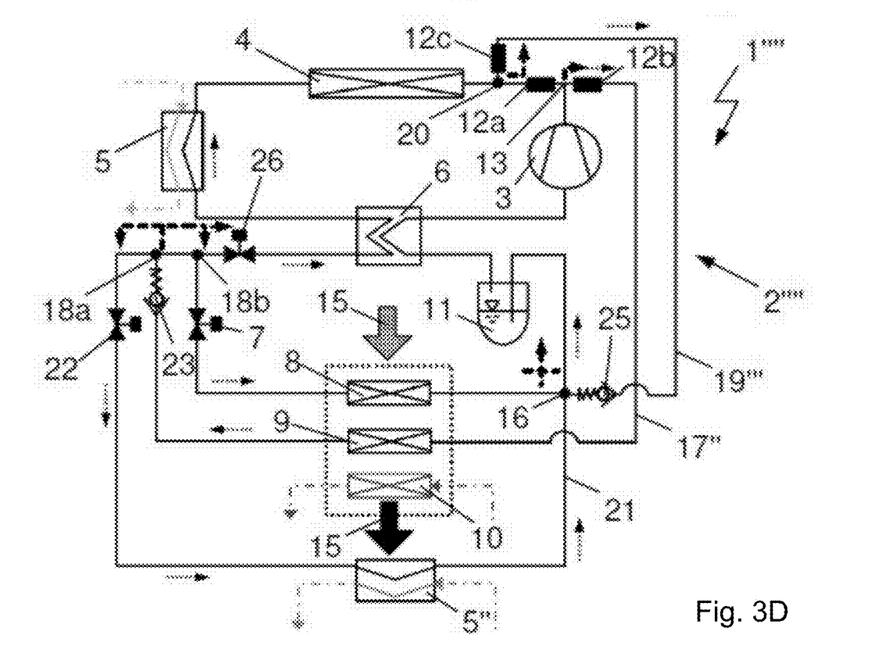
FIGS. 3D and 3F: the refrigerant circuit from FIG. 3C, 3E during operation in a reheat mode of a heat pump mode with serial connection of two heat exchangers operated as heat source and evaporator, especially the coolant/refrigerant heat exchanger and the ambient air/refrigerant heat exchanger.
Figure 3E:
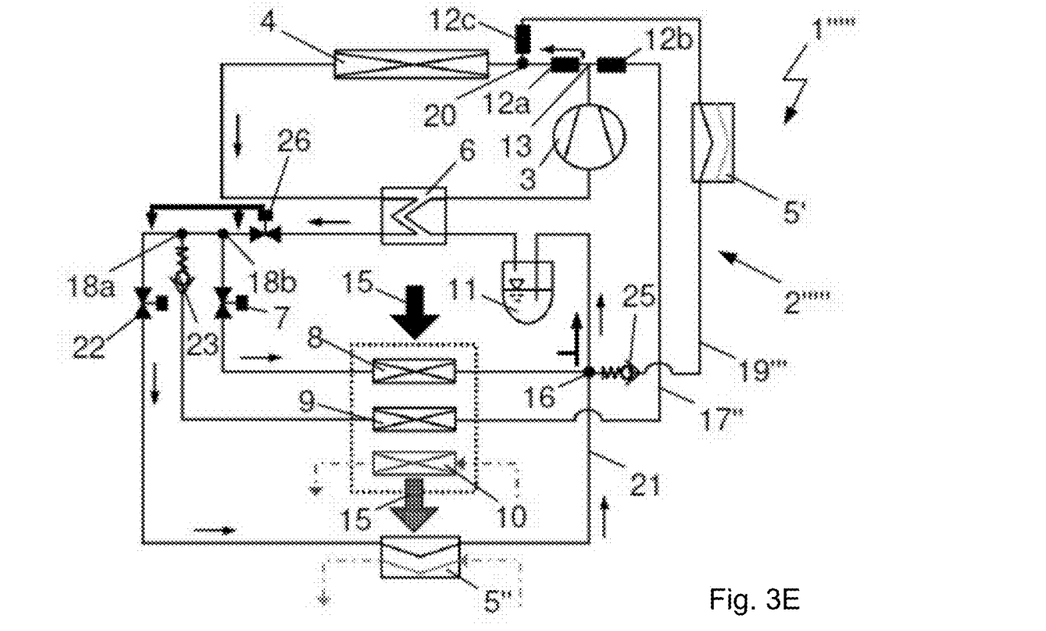

The operation of the refrigerant circuit 2'''', 2''''' in refrigerator mode per FIGS. 3C and 3E substantially corresponds to the operation of the refrigerant circuit 2''' in refrigerator mode per FIG. 3A and thus to the operation of the refrigerant circuit 2'' in refrigerator mode per FIG. 2A, so that in this place reference is made to the remarks for FIG. 2A. The additional second flow path 19''' once more does not receive a flow of refrigerant, the shutoff valve 12c is closed, the check valve 25 prevents refrigerant from flowing into the flow path 19''', so that in the embodiment of the refrigerant circuit 2''''' per FIG. 3E the coolant/refrigerant heat exchanger 5' does not receive a flow of refrigerant. The expansion element 26 is entirely opened.

In the embodiment of the refrigerant circuit 2'''' per FIG. 3C, the coolant/refrigerant heat exchanger 5 receives a flow of refrigerant. Depending on the needs, heat can be transferred from the refrigerant to the coolant of the low temperature coolant circuit or the coolant/refrigerant heat exchanger 5 will not receive a flow of coolant.

Figure 3F:
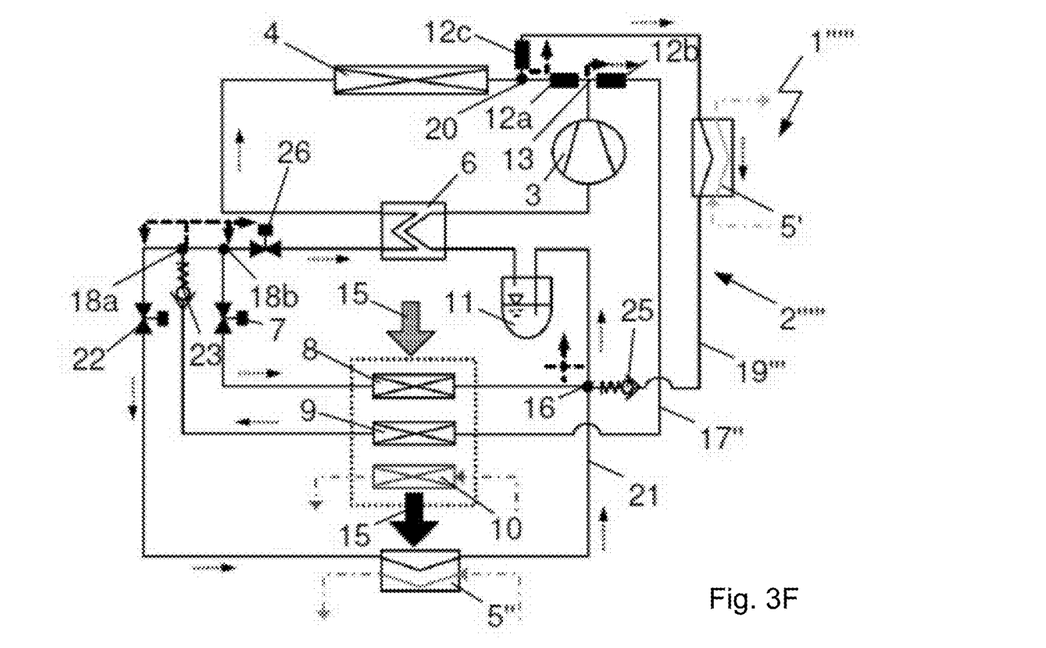

The operation of the refrigerant circuit 2'''', 2''''' in heat pump mode per FIGS. 3D and 3F, the flow direction of the refrigerant being designated by arrows with broken lines, differs from the operation of the refrigerant circuit 2''' in heat pump mode per FIG. 3B by utilizing the coolant/refrigerant heat exchanger 5, 5' as an evaporator of the refrigerant and thus as an additional heat source. In this place, reference is made to the remarks for FIG. 3B and only the utilization of the coolant/refrigerant heat exchanger 5, 5' will be discussed.

Upon flowing through the two serially connected heat exchangers 4, 5, 5' operating as heat sources and evaporator, the refrigerant takes up heat. With the help of the heat exchanger 5, 5', additional heat from a low temperature coolant circuit, such as the electric drive train, the battery or electronic components, is coupled into the refrigerant circuit 2'''', 2'''''. With the heat exchangers 4, 5, 5', two independent heat sources are formed for the evaporation of the refrigerant and thus the uptake of the heat from the refrigerant.

According to the first embodiment per FIG. 3D, the refrigerant first flows through the coolant/refrigerant heat exchanger 5 and evaporates to take up heat from the coolant of the low temperature coolant circuit before it then flows through the ambient air/refrigerant heat exchanger 4 and evaporates further, taking up heat from the ambient air, and possibly becomes superheated. After this, the refrigerant is conducted across the branching point 20 through the second flow path 19''' and through the check valve 25 to the opening 16 and to the collector 11. The heat exchangers 4, 5 can receive a bidirectional flow of the refrigerant.

According to the second embodiment per FIG. 3F, the refrigerant after passing through the internal heat exchanger 6 first flows through the ambient air/refrigerant heat exchanger 4 and evaporates to take up heat from the ambient air, before it then flows across the branching point 20 through the second flow path 19''' and thus through the coolant/refrigerant heat exchanger 5', taking up heat from the coolant of the low temperature coolant circuit and evaporating further, becoming superheated. The refrigerant is then taken through the check valve 25 to the opening 16 and to the collector 11. The heat exchanger 4 can receive a bidirectional flow of the refrigerant.

The expansion element 26 designed in particular as an expansion valve and the internal heat exchanger 6 can also receive a bidirectional flow of the refrigerant.

The refrigerant drawn in by the compressor 3 flows from the collector 11 in the gaseous state through the internal heat exchanger 6 and is cooled down. At the same time, the internal heat exchanger 6 receives the portion of the refrigerant mass flow conducted through the ambient air/refrigerant heat exchanger 4 and the coolant/refrigerant heat exchanger 5'. [0109] The partial mass flow, after flowing through the expansion element 26, is expanded to low pressure and partly evaporated in the internal heat exchanger 6. Furthermore, the refrigerant upon passing through the heat exchanger 4, 5", 8 is evaporated and in particular superheated, before the refrigerant is cooled down upon flowing through the internal heat exchanger 6 before the compression and it has a residual superheating.

With expansion elements 7, 22, 26 opened, the refrigerant circuits 2",2''' are operated in a so-called reheat mode as indicated by the arrows showing the flow of the refrigerant through the heat exchanger 8 in each of FIGS. 3D and 3F. With expansion element 7 closed, the refrigerant circuits 2",2''' are operated in a pure heat pump mode. The pure heat pump mode accordingly resembles each of the flow configurations illustrated in FIGS. 3D and 3F with the exception of the flow through the heat exchanger 8 being ceased in the pure heat pump mode.

Each time the heat sources are the coolant of the low temperature coolant circuits taken through the heat exchangers 5',5", for example that of the electrical drive train, such as the battery, and also the intake air 15 for the passenger compartment and/or the ambient air, depending on the switching of the expansion elements 7, 26. Both during operation of the refrigerant circuit 2"", 2""" in pure heat pump mode and operation in reheat mode, the intake air 15 of the passenger compartment can be further heated after taking up heat at the heat transfer surfaces of the heat exchanger 9, as needed, by flowing across the heating heat exchanger 10.

LIST OF REFERENCE SYMBOLS 1-1''''' Air conditioning system
2-2''''' Refrigerant circuit
3 Compressor
4 Heat exchanger, ambient air/refrigerant heat exchanger
5, 5',5" Heat exchanger, coolant/refrigerant heat exchanger
6 Internal heat exchanger
7 Expansion element
8 Heat exchanger, evaporator
9 Heat exchanger, condenser/gas cooler
10 Heating heat exchanger
11 Collector
12A, 12B Valve, shutoff valve
12c Valve, shutoff valve
13, 20 Branching point
14a, 14b Valve, shutoff valve
15 Passenger compartment intake air
16, 18, 18a Opening
17, 17" First Flow path, flow path
18b Branching point
19, 19',19''' Second flow path
21 Flow path
22 Expansion element
23, 24, 25 Check valve
26 Expansion element

What is claimed is:

1. A method for operating a refrigerant circuit with an air conditioning system of a motor vehicle, the refrigerant circuit configured for operation in a refrigerator mode and in a heat pump mode for intake air being conditioned for a passenger compartment, the method comprising the steps of:

providing the refrigerant circuit comprising a primary circuit including a compressor, a first heat exchanger configured to provide heat transfer between a refrigerant and surrounding air, an expansion element, and a second heat exchanger configured to provide heat transfer from the intake air being conditioned for the passenger compartment to the refrigerant, a first flow path extending from a first branching point between the compressor and the first heat exchanger to a second branching point, the first flow path including a third heat exchanger configured to provide heat transfer from the refrigerant to the intake air being conditioned for the passenger compartment, wherein the third heat exchanger is disposed in the flow direction of the intake air of the passenger compartment after the second heat exchanger, a first coolant/refrigerant heat exchanger of a first coolant circuit, the first coolant/refrigerant heat exchanger arranged within the primary circuit in series connection with the first heat exchanger, a second coolant/refrigerant heat exchanger of the first coolant circuit, wherein the second coolant/refrigerant heat exchanger is arranged in a parallel connection to the second heat exchanger, and a heating heat exchanger of a second coolant circuit configured to warm the intake air being conditioned for the passenger compartment, the heating heat exchanger arranged in the flow direction of the intake air for the passenger compartment after the second heat exchanger, the primary circuit further including an internal heat exchanger having a first side and a second side, the internal heat exchanger configured to transfer heat between a first portion of the refrigerant passing through the first side thereof and a second portion of the refrigerant passing through the second side thereof, wherein the first side of the internal heat exchanger is disposed on the primary circuit between the first heat exchanger and the second branching point and the second side of the internal heat exchanger is disposed on the primary circuit between the second heat exchanger and the compressor, wherein the first coolant/refrigerant heat exchanger is arranged within the primary circuit of the refrigerant circuit between the first heat exchanger and the first side of the internal heat exchanger, and wherein the second branching point is disposed upstream of the second coolant/refrigerant heat exchanger with respect to the flow of the refrigerant during operation of the refrigerant circuit in the refrigerator mode; and conducting the refrigerant during operation of the refrigerant circuit in the heat pump mode through the first heat exchanger and then through the coolant/refrigerant heat exchanger, wherein pressure of the refrigerant is equal in the first heat exchanger and the coolant/refrigerant heat exchanger and the first heat exchanger and the coolant/refrigerant heat exchanger are operated as an evaporator for the refrigerant.

2. A refrigerant circuit of an air conditioning system of a motor vehicle, the refrigerant circuit configured for operation in a refrigerator mode and a heat pump mode, the refrigerant circuit comprising:

a primary circuit including a compressor, a first heat exchanger configured to provide heat transfer between a refrigerant and surrounding air, a first expansion element, and a second heat exchanger configured to provide heat transfer from intake air being conditioned for a passenger compartment to the refrigerant;

a first flow path extending from a first branching point between the compressor and the first heat exchanger to a second branching point, the first flow path including a third heat exchanger configured to provide heat transfer from the refrigerant to the intake air being conditioned for the passenger compartment, wherein the third heat exchanger is disposed in the flow direction of the intake air of the passenger compartment after the second heat exchanger;

a first coolant/refrigerant heat exchanger of a first coolant circuit, the first coolant/refrigerant heat exchanger arranged within the primary circuit in series connection with the first heat exchanger, wherein the refrigerant, depending on the mode of the refrigerant circuit, flows through the first coolant/refrigerant heat exchanger and then through the first heat exchanger or through the first heat exchanger and then through the first coolant/refrigerant heat exchanger;

a second coolant/refrigerant heat exchanger of the first coolant circuit, wherein the second coolant/refrigerant heat exchanger is arranged in a parallel connection to the second heat exchanger;

a heating heat exchanger of a second coolant circuit configured to warm the intake air being conditioned for the passenger compartment, the heating heat exchanger arranged in the flow direction of the intake air for the passenger compartment after the second heat exchanger; and an internal heat exchanger having a first side and a second side, the internal heat exchanger configured to transfer heat between a first portion of the refrigerant passing through the first side thereof and a second portion of the refrigerant passing through the second side thereof, wherein the first side of the internal heat exchanger is disposed on the primary circuit between the first heat exchanger and the second branching point and the second side of the internal heat exchanger is disposed on the primary circuit between the second heat exchanger and the compressor, wherein the first coolant/refrigerant heat exchanger is arranged within the primary circuit of the refrigerant circuit between the first heat exchanger and the first side of the internal heat exchanger, and wherein the second branching point is disposed upstream of the second coolant/refrigerant heat exchanger with respect to the flow of the refrigerant during operation of the refrigerant circuit in the refrigerator mode.

3. The refrigerant circuit according to claim 2, wherein the refrigerant circuit further comprises a collector arranged after the second heat exchanger in the flow direction of the refrigerant.

4. The refrigerant circuit according to claim 2, wherein the refrigerant circuit is further configured for operation in a reheat mode, wherein the refrigerant can be apportioned between the second coolant/refrigerant heat exchanger and the second heat exchanger, and wherein a second expansion element is disposed in front of the second coolant/refrigerant heat exchanger and a third expansion element is disposed in front of the second heat exchanger in the flow direction of the refrigerant, and the first flow path has a check valve disposed between the third heat exchanger and the second branching point for allowing the refrigerant to pass in the flow direction to the second branching point.

5. The refrigerant circuit according to claim 2, further comprising a second flow path extending from a third branching point between the compressor and the first heat exchanger to a fourth branching point, wherein the fourth branching point is arranged in the flow direction of the refrigerant in front of the compressor and the second flow path receives no flow during the operation of the refrigerant circuit in the refrigerator mode.

6. The refrigerant circuit according to claim 2, wherein pressure of the refrigerant is equal in the first heat exchanger and the first coolant/refrigerant heat exchanger, and wherein the first heat exchanger and the first coolant/refrigerant heat exchanger are each operated as an evaporator for the refrigerant during the operation of the refrigerant circuit in the heat pump mode.

7. The refrigerant circuit according to claim 2, wherein the second branching point forms a division of the refrigerant towards each of the second heat exchanger and the second coolant/refrigerant heat exchanger during operation of the refrigerant circuit in the heat pump mode.

8. The refrigerant circuit according to claim 2, wherein coolant of the first coolant circuit flows through the first coolant/refrigerant heat exchanger only during operation of the refrigerant circuit in the heat pump mode and not during operation of the refrigerant circuit in the refrigerator mode, and wherein the coolant of the first coolant circuit flows through the second coolant/refrigerant heat exchanger during operation of the refrigerant circuit in each of the refrigerator mode and the heat pump mode.

* * * * *